Nov. 4, 1941.  J. W. DAWSON  2,261,144
ARC DISCHARGE STARTING ARRANGEMENT AND METHOD
Filed Feb. 2, 1939  2 Sheets-Sheet 1
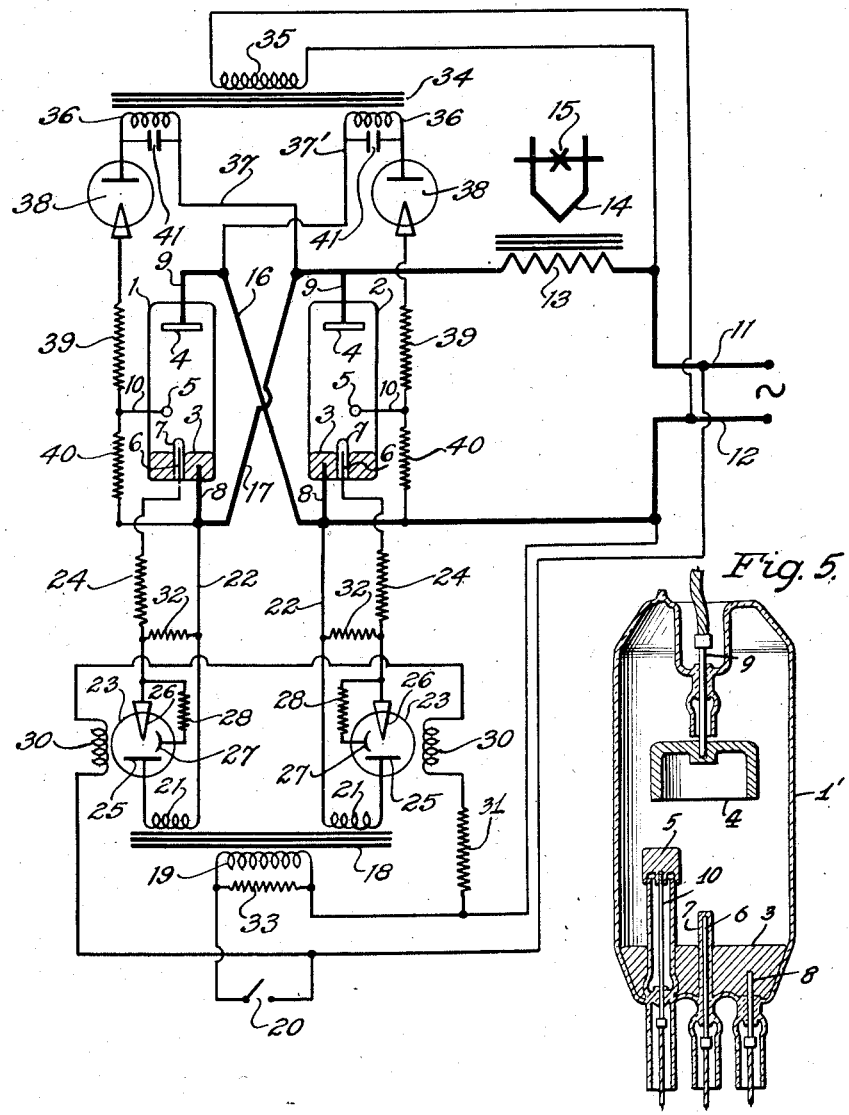
Inventor
John W. Dawson
by Elmer J. Gorn
Attorney

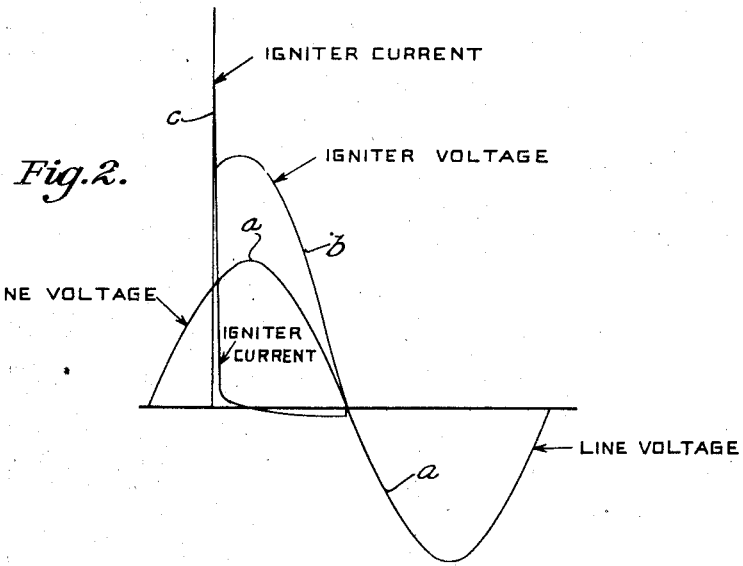
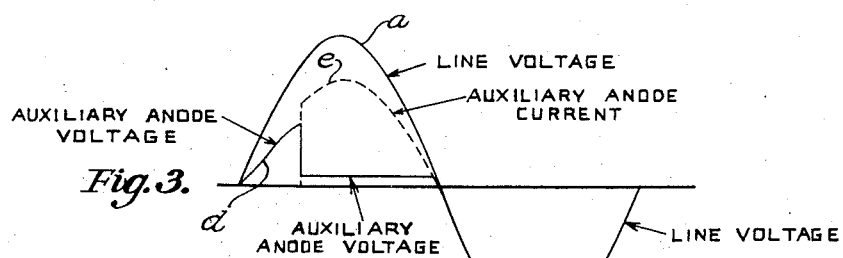
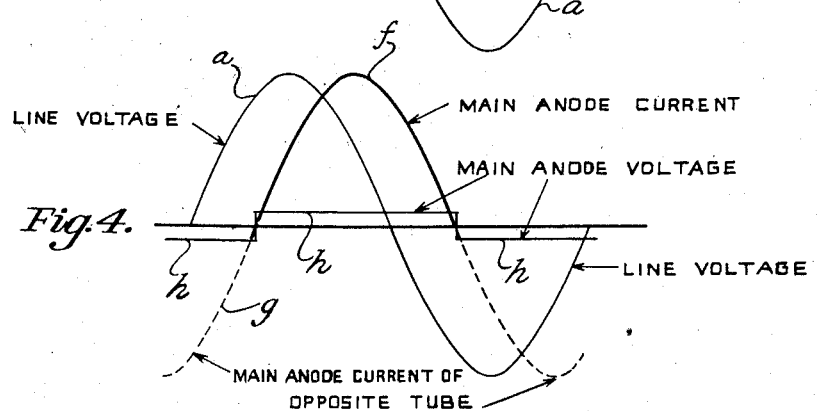

Patented Nov. 4, 1941

2,261,144

UNITED STATES PATENT OFFICE 2,261,144

ARC DISCHARGE STARTING ARRANGEMENT AND METHOD

John W. Dawson, Auburndale, Mass., assignor to Raytheon Manufacturing Company, Newton, Mass., a corporation of Delaware Application February 2, 1939, Serial No. 254,203

25 Claims. (Cl. 175—354)

This invention relates to an arrangement and a method for starting an arc spot on a cathode, particularly of the pool type, of a discharge tube by means of a high starting voltage impressed on a starting electrode separated by an insulating wall from the cathode. Previous methods and arrangements for operating tubes of this kind have resulted in a very short life of the tube. After a comparatively short period of operation, voltages impressed on the starting electrode which initially produce fairly reliable starting were no longer sufficient, and the starting became erratic. This effect became progressively worse until even very high voltages failed to cause reliable starting.

An object of this invention is to devise a method and an arrangement for operating tubes having an arc-starting arrangement of the foregoing type, whereby long life is secured.

Another object is to insure reliable starting throughout the life of such a device.

A further object is to prevent substantial changes in the starting characteristics of such a device during life.

The foregoing and other objects of this invention will be best understood from the following description of an exemplification thereof, reference being had to the accompanying drawings wherein:

Fig. 1 represents a diagrammatic circuit arrangement incorporating my invention;

Figs. 2, 3 and 4 are curves representing voltage and current conditions on the various electrodes of the arc tubes represented in Fig. 1; and Fig. 5 is a cross-section of one type of tube which may be used in my invention.

Fig. 1 represents a circuit arrangement in which both halves of an alternating current wave are permitted to flow through a load. For this purpose two arc discharge tubes 1 and 2 of the type discussed above are provided. Each tube is preferably constructed as shown in Fig. 5 with the usual sealed envelope 1' containing a conducting liquid pool cathode 3, preferably of mercury. Each arc tube likewise contains an anode 4 and an auxiliary starting anode 5. In order to initiate an arc spot on each mercury pool 3, each tube is likewise provided with an igniter or starting electrode 6. Each starting electrode 6 consists of a metal, such as tungsten, and projects through the surface of its associated mercury pool 3. Each starting electrode 6 is, however, insulated from its mercury pool 3 by means of an insulating member 7, preferably of glass, surrounding the starting electrode 6 as it passes through the mercury pool 3. The cathode 3, main anode 4, and auxiliary anode 5 of each tube are provided with lead-in conductors 8, 9 and 10, respectively. Each tube 1 and 2 is preferably of the type described and claimed in the co-pending application of Percy L. Spencer, Serial No. 251,069, filed January 16, 1939, in which the starting electrode 6 is made of tungsten of the order of 100 mils in diameter, and 7 consists of a coating of "Pyrex" glass of the order of 10 mils or less, preferably 5 mils thick, which is fused onto the surface of the electrode 6.

In tubes of the type described above, the application of a comparatively high voltage to the starting electrode 6 will initiate the cathode spot on the mercury pool 3, and the auxiliary anode 5 will pick up and maintain the arc until the main anode 4 is ready to conduct current.

Previous attempts have been made to operate tubes of the above type by supplying A. C. impulses to the starting electrodes 6 and to the auxiliary anodes 5. The result has been the short life and erratic operation mentioned above. I have found, however, that if during the occurrence of any substantial ionization in the tube, the electrode 6 is prevented from assuming a substantial negative potential with respect to the ionized medium within the tube, the life of the tube is greatly increased. I have also found that if the same criterion is adopted for the potentials to which the electrodes 4 and 5 are subjected, the life of the tube is likewise increased.

In accordance with my present understanding of the theory of operation of these tubes, the novel results described above are due substantially to the following reasons. The erratic behavior of the tubes and the termination of the life thereof appear to be due to the desensitizing of the outer surface of the insulating member 7. This desensitizing appears likewise to be due to the bombardment of this surface by relatively high-speed positive ions. I believe that mercury ions, for example, upon colliding with the surface of the insulating member 7 become embedded or trapped in said surface, thus producing a change in the surface condition of the insulating member 7 which prevents the creation of arc-starting conditions upon the application of starting voltages to the electrode 6. If, however, only positive voltages are supplied to the electrode 6 and all negative voltages of any substantial value are suppressed, the ions present during the passage of a discharge through the arc tubes will not have a tendency to bombard the surface of the insulating member 7. Another factor which appears to have affected the life of such tubes, although probably to a lesser extent than that described above, has been the sputtering of material from the electrodes 4 and 5 onto the surface of the insulating member 7. This sputtering is also due to the bombardment of these electrodes by relatively high-speed positive ions. By impressing only positive voltages on the electrodes 4 and 5 during the presence of any substantial ionization in the tube, such bombardment by positive ions is prevented, and the sputtering tending to contaminate the surface of the insulating member 7 is likewise prevented. Since such positive ion bombardment will not occur unless substantial ionization is present, it is not necessary to maintain the foregoing voltage conditions if ionization is substantially absent in the tube. Thus, for example, it may be permissible to permit the anode 4 to swing negative if at that time no discharge is passing to the auxiliary anode 5. However, in the particular embodiment which I have illustrated and which will be described below, the anode 4 is not permitted to swing sufficiently negative to be subjected to high-speed positive ion bombardment sufficient to produce substantial sputtering therefrom.

The circuit which I have illustrated by way of example represents one arrangement for accomplishing the foregoing conditions. It is illustrated as a resistance-welding circuit. This circuit consists of two power lines 11 and 12 which are connected to a suitable source of alternating current. The power line 11 is led through the primary winding 13 of a welding transformer to the lead-in 9 of the anode 4 of tube 2, while the power line 12 is led directly to the lead-in 8 of the cathode 3 of said tube 2. The welding transformer is provided with a secondary 14 across which a resistance-welding load 15 may be connected. In order to permit both halves of the alternating current wave to pass through the primary 13, a pair of cross connections 16 and 17 are provided connecting the anode 4 of tube 1 with the cathode 3 of tube 2, and the anode 4 of tube 2 with the cathode 3 of tube 1.

In order to supply igniting potentials to the starting electrodes 6, there is provided an igniting transformer 18 having a primary 19 energized from the power lines 11 and 12 through a control switch 20. The igniting transformer is provided with two high-voltage secondary windings 21. Each secondary winding 21 has one end thereof connected by means of a conductor 22 directly to the lead-in conductor 8 of the cathode 3 of its associated arc tube. The other end of the secondary winding 21 is connected through a controlled rectifier tube 23 in series to the starting electrode 6 of said associated arc tube. A resistance 24 may be included in this circuit if desired.

Each tube 23 may be a vapor discharge rectifier in which the starting of current flow may be controlled by a control means. Preferably these tubes are of the type described and claimed in the patent to Percy L. Spencer, No. 2,124,682, for an improvement in Electrical gaseous discharge devices. Tubes of this type are provided with a thermionic cathode 26, an anode 25, and a collector electrode 27 adjacent the discharge path between the cathode and anode. The tubes are filled with an ionizable gas, such as, for example, mercury vapor or argon. The collector electrode 27 is preferably connected to the cathode 26 through a resistance 28. The starting of each tube 23 is controlled by means of a magnet coil 30 which impresses a transverse magnetic field upon the tube 23. In tubes of this kind, when the field due to the coil 30 passes through zero, current will be initiated between the cathode 26 and anode 25 if at that instant the anode 25 has impressed a positive voltage upon it. In order to energize the coils 30, they are connected in series with a resistance 31 across the power lines 11 and 12. Other types of controlled rectifiers, such as grid-controlled gaseous discharge rectifiers, could be utilized.

A resistance 32 is connected from the conductor 22 to the lower end of the resistance 24. The resistance 32 preferably has a high value of the order of 200,000 ohms. Since the resistances 24 and 32 are connected directly between the starting electrode 6 and the cathode 3, the positive potential applied to the electrode 6 is permitted to leak off when the tube 23 stops conducting current. If provisions for removing the charge from electrode 6 were not made, it would have a tendency to acquire a positive potential charge which would block the positive voltage surge in the next period of conduction of tube 23. The resistance 32 also places a load across the tube 23 so as to insure its reliable operation despite the short duration of the current pulse to electrode 6. Any back current of the tube 23 would tend to build up undesirable negative charges on electrode 6. The resistance 32 provides a path for such back currents to a sufficient extent to eliminate such a condition. In order to prevent surges from occurring in the system, it is desirable to connect a resistance 33 across the primary winding 19 of the igniting transformer 18.

In order to provide each auxiliary anode 5 with a potential so that an arc is established to said auxiliary anode 5, each time an igniting impulse is supplied to the starting electrode 6, there is provided an auxiliary transformer 34 having a primary winding 35 energized from the power lines 11 and 12. The auxiliary transformer 34 is provided with two secondary windings 36. The voltage of each winding 36 may be of the order of 200 to 300 volts. One end of one secondary winding 36 is connected by means of a conductor 37 to the conductor 17 leading to the cathode 3 of tube 1, while one end of the other secondary winding 36 is connected by means of a conductor 37' to the conductor 16 leading to the cathode 3 of the tube 2. The opposite end of each secondary winding 36 is connected through a rectifier 38 and a current-limiting resistance 39 to the lead-in conductor 10 of the auxiliary anode 5 of its associated tube. The resistance 39 is sufficient to limit the current to the auxiliary anode 5 to a value necessary to pick up and maintain the arc. The resistance may have a value, for example, of 100 ohms.

I believe that when conditions are created at the starting electrode 6 tending to initiate a cathode spot, the actual creation of that spot requires a flow of current of the order of several m. a. Upon the creation of the spot I also believe that a flow of current rising rapidly to a value of the order of several amperes is necessary in order to establish a stable arc spot capable of supplying the needs of the load circuit. When the arc spot has become well established and moves freely and at random on the cathode surface, higher values of current seem to be necessary to maintain it. Prior arrangements for starting arc tubes have often been erratic and unreliable because the circuit for picking up the arc from the cathode has been unable to meet the requirements specified above. In my present invention, however, this difficulty is avoided. First of all, the circuit of the auxiliary anode 5 is made with as little inductance as practical in order to permit the current to the anode 5 to rise rapidly. Also by providing a resistance 40 between the auxiliary anode 5 and the cathode 3, and a condenser 41 across the corresponding secondary winding 36, the ability of the circuit to perform in the manner specified is greatly increased. The resistance 40 which may, for example, be of the order of magnitude of several thousand ohms, establishes a flow of current through the circuit immediately past the lead-in conductor 10 so that upon the starting of a discharge to the anode 5, the circuit is not called upon to establish a current through it from a zero value. The value of this current at the instant of ignition by electrode 6 is preferably of the order of magnitude of the minimum current flow necessary to create the cathode spot, as specified above, or greater. Thus, particularly if resistance 40 has substantially no inductance, upon the initiation of a cathode spot by electrode 6, a current of the requisite value can be started substantially instantaneously to the pickup anode 5. It is desirable that the resistance 40 be connected as close to the anode 5 and the cathode 3 as possible. Thus in some instances the resistance 40 may be placed within the envelope of the tube. As in the case of resistance 32, resistance 40 likewise prevents the imposition of negative voltages on the anode 5 due to back current in the rectifier 38. The condenser 41 serves as a reservoir of energy which can immediately be delivered to the anode 5 to cause a rapid rise of the discharge current thereto to the higher value until the secondary winding 36 is ready to maintain the current.

When the power lines 11 and 12 are energized and the control switch 20 is closed, the system illustrated in Fig. 1 is set in operation, and alternating current is supplied to the resistance-welding load 15. By controlling the time during which the switch 20 is maintained closed, the time during which current flows in the resistance-welding load 15 can be controlled. In a typical system of this kind, the current flowing through the circuit of the primary winding 13 lags the line voltage by about 60 degrees. In such a system it is desirable that the igniting voltage impulse be supplied to the starting electrode 6 of each tube slightly before the anode of that tube starts to conduct current. Thus, for example, in the typical case mentioned, the flux through the coils 30 of the controlled rectifiers 23 is adjusted to pass through zero at about five degrees sooner than the 60-degree lag mentioned above. This phase relationship is produced by the presence of the resistance 31 in series with the inductance of the coils 30. If an adjustment is desired, the value of the resistance 31 may be changed.

The conditions which exist on the various electrodes of tubes 1 and 2, under the above conditions, are illustrated in Figs. 2, 3 and 4, respectively. These figures do not purport to represent the quantitative values of the currents and voltages represented but indicate merely the qualitative conditions which exist. In each of Figs. 2, 3 and 4 the line voltage is represented by $a$.

Fig. 2 represents the voltage conditions on the igniter or starting electrode 6. When the associated controlled rectifier 23 starts to conduct current, the voltage $b$ is impressed upon the starting electrode 6. It will be noted that the start of this voltage lags the line voltage by about 55 degrees which is the condition as described above. This igniter voltage may have a peak value in a particular instance of about 3500 volts. Upon the application of the igniter voltage to the starting electrode 6, a very sharp surge of igniter current $c$ flows to said starting electrode. As will be noted, this igniter current falls very rapidly, and as the peak of the igniter voltage is passed, a relatively small value of current flows in the opposite direction in said circuit.

Fig. 3 represents the conditions existing at each auxiliary anode 5. Upon the application of the igniter voltage to the starting electrode 6, the auxiliary anode current $e$ rises vary rapidly to a value at which the arc is sustained; then the current follows the usual sine wave variation, due to the application of a sine wave voltage to said auxiliary anode. If an igniting impulse were supplied to the electrode 6 at the beginning of the auxiliary anode voltage wave, the current to the auxiliary anode at the instant of desired starting would be very small and would follow a sine wave variation in accordance with the rise of the auxiliary anode voltage. Unless the peak current of the auxiliary anode were very high, the rate of rise of current to the auxiliary anode under these conditions might not be high enough to satisfy the conditions of reliable starting as described above. However, by igniting the tube at a point relatively late in the auxiliary anode voltage wave, the auxiliary anode voltage will have reached a substantial value calling for a substantial current. Upon ignition, the circuit which I have described permits the current to rise rapidly to the value called for and produces a reliable starting of the arc spot. Immediately upon the initiation of such a discharge current to said auxiliary anode, the voltage impressed upon it drops to the relatively low arc drop voltage, which may be about 15 volts. In systems in which the main load current is not delayed, it is desirable to advance the phase of the auxiliary anode voltage in order to produce delayed firing at the auxiliary anode occurring prior to the desired starting of the main anode current.

Fig. 4 represents the conditions existing at each main anode 4. Although an arc has been established in a corresponding tube at a phase angle of about 55 degrees, the corresponding main anode current $f$ does not start until a phase angle of about 60 degrees. This is due to the fact that the current to the main anode of the opposite tube does not fall to zero until said 60-degree lag, and therefore the anode of the tube under consideration cannot start to conduct current until that time. Since the tubes 1 and 2 are directly connected across each other, the voltage between the cathode and anode of each tube is held down to the voltage drop across the other tube as long as said other tube is conducting current. Furthermore, each tube starts to conduct current immediately upon the cessation of current in the opposite tube. When such conduction of current starts, likewise the voltage across the tube conducting current is maintained at the relatively low arc drop potential. This condition is illustrated by the variation of the main anode voltage represented at $h$ in Fig. 4. As will be seen, this voltage never rises either in the positive or negative direction above the relatively low arc drop potential. Although the main anode voltage is negative for about five degrees during the period in which the auxiliary anode 5 is conducting current, yet since that value is low, as indicated above, substantial positive ion bombardment of the main anode does not occur and substantial sputtering thereof is avoided. In some systems it may be desirable to delay the firing of the tube still further in order to control the magnitude of current supplied to the load.

From Figs. 2, 3 and 4 it will be seen that although the main anode continues to conduct current after the igniter voltage and the auxiliary anode voltage have fallen to zero, yet due to the presence of the rectifiers 23 and 38, the igniter voltage and the auxiliary anode voltage are prevented from becoming substantially negative during the remaining period of conduction of the main anode. Actually the auxiliary anode 5 and the surface of the insulator 7 may assume slightly negative potentials due to the falling thereon of random electrons. However, these negative voltages are probably of the order of several volts. Negative voltages of this order of magnitude, whether created in this way or whether impressed on these elements by the external circuit, are insufficient to produce the deleterious effects described. Therefore, although in this latter period the arc tube contains a large number of positive ions, yet since substantial negative voltages on the electrodes 5 and 6 are suppressed during that time, these positive ions are not attracted in any substantial number or at any substantial velocity either to the surface of the member 7 or to the auxiliary anode 5. In this way sputtering of the auxiliary anode 5 is avoided, and the desensitizing of the surface of the insulating member 7 is likewise prevented.

Of course it is to be understood that this invention is not limited to the particular details as described above as many equivalents will suggest themselves to those skilled in the art. For example, in some instances the provision of an auxiliary pick-up anode may not be necessary, in which case the novel results of my invention may be imparted to the tube by operating it in accordance with the mode of operation as described above. Also where a system for generating starting impulses, either to the starting electrode 6 or to the auxiliary anode 5, supplies substantially unidirectional voltage impulses, the use of a rectifier in the circuit of each of these elements will not be necessary. The particular circuit arrangement and type of load supplied likewise may assume a wide variety of forms. It is accordingly desired that the appended claims be given a broad interpretation commensurate with the scope of the invention within the art.

What is claimed is:

1. In combination, an arc discharge tube comprising an arc cathode, an anode, and an igniting electrode separated from said cathode by a dielectric wall member, means for applying a periodic voltage between said anode and cathode to cause periodic unidirectional discharges to occur between said cathode and anode, and means for supplying to said igniting electrode periodic positive igniting voltage impulses, having no substantial negative values during periods of substantial ionization in said tube, to start an arc spot for initiating each of said periodic discharges.

2. In combination, an arc discharge tube comprising an arc cathode, an anode, and an igniting electrode separated from said cathode by a dielectric wall member, means for applying a periodic voltage between said anode and cathode to cause periodic unidirectional discharges to occur between said cathode and anode, and means for supplying to said igniting electrode periodic positive igniting voltage impulses, having no substantial negative values, to start an arc spot for initiating each of said periodic discharges.

3. In combination, an arc discharge tube comprising an arc cathode, an anode, and an igniting electrode separated from said cathode by a dielectric wall member, means for applying a periodic voltage between said anode and cathode to cause periodic unidirectional discharges to occur between said cathode and anode, and means for supplying to said igniting electrode periodic positive igniting voltage impulses, having no substantial negative values during periods of substantial ionization in said tube, to start an arc spot for initiating each of said periodic discharges, the periodicity of said igniting impulses being equal to the periodicity of said periodic discharges.

4. In combination, an arc discharge tube comprising an arc cathode, an anode, and an igniting electrode separated from said cathode by a dielectric wall member, means for applying a periodic voltage between said anode and cathode to cause periodic unidirectional discharges to occur between said cathode and anode, and means for supplying to said igniting electrode periodic positive igniting voltage impulses, having no substantial negative values to start an arc spot for initiating each of said periodic discharges, the periodicity of said igniting impulses being equal to the periodicity of said periodic discharges.

5. In combination, an arc discharge tube comprising an arc cathode, an anode, and an igniting electrode separated from said cathode by a dielectric wall member, means for applying a periodic voltage between said anode and cathode to cause periodic unidirectional discharges to occur between said cathode and anode, and means for supplying to said igniting electrode periodic positive igniting voltage impulses, having no substantial negative values during periods of substantial ionization in said tube, to start an arc spot for initiating each of said periodic discharges, the periodicity of said igniting impulses and of said periodic discharges being equal to the periodicity of said periodic voltage.

6. In combination, an arc discharge tube comprising an arc cathode, an anode, and an igniting electrode separated from said cathode by a dielectric wall member, means for applying a periodic voltage between said anode and cathode to cause periodic unidirectional discharges to occur between said cathode and anode, and means for supplying to said igniting electrode periodic positive igniting voltage impulses, having no substantial negative values, to start an arc spot for initiating each of said periodic discharges, the periodicity of said igniting impulses and of said periodic discharges being equal to the periodicity of said periodic voltage.

7. In combination, an arc discharge tube comprising an arc cathode, a main anode, an auxiliary pickup anode, and an igniting electrode separated from said cathode by a dielectric wall member, means for applying a periodic voltage between said main anode and cathode to cause periodic unidirectional discharges to occur between said cathode and main anode, means for supplying to said igniting electrode periodic positive igniting voltage impulses, having no substantial negative values during periods of substantial ionization in said tube, to start an arc spot for initiating each of said periodic discharges, and means for supplying to said pickup anode periodic positive pickup voltage impulses, having no substantial negative values during the periods of said discharges, to pick up and maintain the arc upon the initiation of each arc spot until said main anode is ready to start conducting current.

8. In combination, an arc discharge tube comprising an arc cathode, a main anode, an auxiliary pickup anode, and an igniting electrode separated from said cathode by a dielectric wall member, means for applying a periodic voltage between said main anode and cathode to cause periodic unidirectional discharges to occur between said cathode and main anode, means for supplying to said igniting electrode periodic positive igniting voltage impulses, having no substantial negative values, to start an arc spot for initiating each of said periodic discharges, and means for supplying to said pickup anode periodic positive pickup voltage impulses, having no substantial negative values, to pick up and maintain the arc upon the initiation of each arc spot until said main anode is ready to start conducting current.

9. In combination, an arc discharge tube comprising an arc cathode, a main anode, an auxiliary pickup anode, and an igniting electrode separated from said cathode by a dielectric wall member, means for applying a periodic voltage between said main anode and cathode to cause periodic unidirectional discharges to occur between said cathode and main anode, means for supplying to said igniting electrode periodic positive igniting voltage impulses, having no substantial negative values during periods of substantial ionization in said tube, to start an arc spot for initiating each of said periodic discharges, means for supplying to said pickup anode periodic positive pickup voltage impulses, having no substantial negative values during the periods of said discharges, to pick up and maintain the arc upon the initiation of each arc spot until said main anode is ready to start conducting current, and means for keeping the voltage on said main anode from becoming substantially negative throughout the period of conduction of said pickup anode.

10. The method of operating an arc discharge tube comprising an arc cathode, an anode, and an igniting electrode separated from said cathode by a dielectric wall member, which comprises applying a periodic voltage between said anode and cathode to cause periodic unidirectional discharges to occur between said cathode and anode, and supplying to said igniting electrode periodic positive igniting voltage impulses, having no substantial negative values during periods of substantial ionization in said tubes, to start an arc spot for initiating each of said periodic discharges.

11. The method of operating an arc discharge tube comprising an arc cathode, an anode, and an igniting electrode separated from said cathode by a dielectric wall member, which comprises applying a periodic voltage between said anode and cathode to cause periodic unidirectional discharges to occur between said cathode and anode, and supplying to said igniting electrode periodic positive igniting voltage impulses, having no substantial negative values, to start an arc spot for initiating each of said periodic discharges.

12. The method of operating an arc discharge tube comprising an arc cathode, a main anode, an auxiliary pickup anode, and an igniting electrode separated from said cathode by a dielectric wall member, which comprises applying a periodic voltage between said main anode and cathode to cause periodic unidirectional discharges to occur between said cathode and main anode, supplying to said igniting electrode periodic positive igniting voltage impulses, having no substantial negative values during the periods of said discharges, to start an arc spot for initiating each of said periodic discharges, and supplying to said pickup anode periodic positive pickup voltage impulses, having no substantial negative values during periods of substantial ionization in said tube, to pick up and maintain the arc upon the initiation of each arc spot until said main anode is ready to start conducting current.

13. The method of operating an arc discharge tube comprising an arc cathode, a main anode, an auxiliary pickup anode, and an igniting electrode separated from said cathode by a dielectric wall member, which comprises applying a periodic voltage between said main anode and cathode to cause periodic unidirectional discharges to occur between said cathode and main anode, supplying to said igniting electrode periodic positive igniting voltage impulses, having no substantial negative values, to start an arc spot for initiating each of said periodic discharges, and supplying to said pickup anode periodic positive pickup voltage impulses, having no substantial negative values to pick up and maintain the arc upon the initiation of each arc spot until said main anode is ready to start conducting current.

14. The method of operating an arc discharge tube comprising an arc cathode, a main anode, an auxiliary pickup anode, and an igniting electrode separated from said cathode by a dielectric wall member, which comprises applying a periodic voltage between said main anode and cathode to cause periodic unidirectional discharges to occur between said cathode and main anode, supplying to said igniting electrode periodic positive igniting voltage impulses, having no substantial negative values during the periods of said discharges, to start an arc spot for initiating each of said periodic discharges, supplying to said pickup anode periodic positive pickup voltage impulses, having no substantial negative values during periods of substantial ionization in said tube, to pick up and maintain the arc upon the initiation of each arc spot until said main anode is ready to start conducting current, and keeping the voltage on said main anode from becoming substantially negative throughout the period of conduction of said pickup anode.

15. In combination, an arc discharge tube comprising an arc cathode, a main anode, an auxiliary pickup anode element, and igniting means for initiating an arc spot on said cathode, means for applying a periodic voltage between said main anode and cathode to cause periodic unidirectional discharges to occur between said cathode and main anode, means for supplying periodic voltage impulses to said igniting means to start an arc spot for each of said periodic discharges, a periodic source of current connected between said pickup anode element and said cathode to pick up and maintain the arc upon the initiation of each arc spot until said main anode is ready to start conducting current, and an impedance in series with said last-named source and connected between said pickup anode element and said cathode to establish a flow of current from said last-named source prior to the start of current flow to said pickup anode.

16. In combination, an arc discharge tube comprising an arc cathode, a main anode, an auxiliary pickup anode element, and igniting means for initiating an arc spot on said cathode, means for applying a periodic voltage between said main anode and cathode to cause periodic unidirectional discharges to occur between said cathode and main anode, means for supplying periodic voltage impulses to said igniting means to start an arc spot for each of said periodic discharges, a periodic source of current connected between said pickup anode element and said cathode to pick up and maintain the arc upon the initiation of each arc spot until said main anode is ready to start conducting current, and a resistance in series with said last-named source and connected between said pickup anode element and said cathode to establish a flow of current from said last-named source prior to the start of current flow to said pickup anode.

17. In combination, an arc discharge tube comprising an arc cathode, a main anode, an auxiliary pickup anode element, and igniting means for initiating an arc spot on said cathode, means for applying a periodic voltage between said main anode and cathode to cause periodic unidirectional discharges to occur between said cathode and main anode, means for supplying periodic voltage impulses to said igniting means to start an arc spot for each of said periodic discharges, a periodic source of current connected between said pickup anode element and said cathode to pick up and maintain the arc upon the initiation of each arc spot until said main anode is ready to start conducting current, an impedance in series with said last-named source and connected between said pickup anode element and said cathode to establish a flow of current from said last-named source prior to the start of current flow to said pickup anode element, and a condenser connected across said last-named source to create a ready supply of current for said pickup anode upon the start of current flow to said pickup anode.

18. In combination, an arc discharge tube comprising an arc cathode, a main anode, an auxiliary pickup anode element, and igniting means for initiating an arc spot on said cathode, means for applying a periodic voltage between said main anode and cathode to cause periodic unidirectional discharges to occur between said cathode and main anode, means for supplying periodic voltage impulses to said igniting means to start an arc spot for each of said periodic discharges, a periodic source of current connected between said pickup anode element and said cathode to pick up and maintain the arc upon the initiation of each arc spot until said main anode is ready to start conducting current, and a resistance in series with said last-named source and connected between said pickup anode element and said cathode to establish a flow of current through said resistance between said pickup anode element and said cathode prior to the start of current flow to said pickup anode.

19. In combination, an arc discharge tube comprising an arc cathode, a main anode, an igniting electrode, and an auxiliary pickup anode, means for applying a periodic voltage between said main anode and cathode to cause periodic unidirectional discharges to occur between said cathode and main anode, an igniting circuit comprising an alternating voltage source connected in series with a rectifier and an impedance, and means for coupling said igniting electrode across said impedance, said impedance being of a value to supply igniting impulses to said igniting electrode in response to the flowing of the current impulses supplied to said impedance from said rectifier, and an alternating voltage source connected in series with a rectifier to said auxiliary anode.

20. In combination, a discharge tube comprising an arc cathode, an anode, and an igniting electrode, means for applying a voltage between said anode and cathode to cause discharges to occur between said cathode and anode, an igniting circuit comprising an alternating voltage source connected in series with a delayed firing rectifier, and a relatively high impedance of sufficient value to produce an igniting impulse in response to each pulse of current flowing through said rectifier, and means for supplying said igniting impulses to said igniting electrode to initiate arc spots on the cathode.

21. In combination, a discharge tube comprising an arc cathode, an anode, and an igniting electrode separated from said cathode by a dielectric wall member, means for applying a voltage between said anode and cathode to cause discharges to occur between said cathode and anode, an igniting circuit comprising an alternating voltage source connected in series with a delayed firing rectifier, and a relatively high impedance of sufficient value to produce an igniting impulse in response to each pulse of current flowing through said rectifier, and means for supplying said igniting impulses to said igniting electrode to initiate arc spots on the cathode.

22. In combination, a discharge tube comprising an arc cathode, a first anode, a second anode element, and igniting means for initiating an arc spot on said cathode, means for applying a voltage between said first anode and said cathode to cause a discharge to occur between said cathode and said first anode, means for supplying a voltage impulse to said igniting means to start an arc spot, a source of current connected between said second anode element and said cathode to pick up and maintain the arc upon the initiation of said arc spot until said first anode is ready to start conducting current, and a condenser connected across said last-named source to create a ready supply of current for said second anode upon the start of current flow to said second anode.

23. In combination, a discharge tube comprising an arc cathode, an anode, and an igniting electrode for initiating an arc spot on said cathode, means for applying a voltage between said anode and cathode to cause a discharge to occur between said cathode and anode, and means for supplying to said igniting electrode periodic igniting voltage impulses having no substantial negative values during periods of substantial ionization in said tube to start an arc spot for initiating said discharge.

24. In combination, a discharge tube comprising an arc cathode, a first anode, a second anode, and an igniting electrode for initiating an arc spot on said cathode, means for applying a voltage between said first anode and said cathode to cause a discharge to occur between said cathode and said first anode, means for supplying to said igniting electrode periodic igniting voltage impulses to start arc spots for initiating said discharge, and means for supplying to said second anode a pickup voltage to pick up and maintain the arc upon the initiation of each arc spot until said first anode is ready to start conducting current, said voltages being related to said electrodes so that no electrode assumes a substantial negative potential while substantial ionization exists in the tube.

25. In combination, a discharge tube comprising an arc cathode, a plurality of additional electrodes including an igniting electrode for initiating arc spots on said cathode, means for applying voltages to the electrodes of said tubes to the voltage supplied to said igniting electrode furnishing igniting voltage impulses for initiating arc spots on said cathode, said voltages being so related to each other that no electrode assumes substantial negative potential while substantial ionization exists in the tube.

JOHN W. DAWSON.